US005103245A

United States Patent [19]

Yoshida

[11] Patent Number: 5,103,245

[45] Date of Patent: Apr. 7, 1992

[54] RECORDING APPARATUS HAVING HEAT-GENERATING ELEMENTS DRIVEN IN VIEW OF PAST RECORDING

[75] Inventor: Takehiro Yoshida, Tokyo, Japan

[73] Assignee: Canon Kabushiki Kaisha, Tokyo, Japan

[21] Appl. No.: 559,824

[22] Filed: Jul. 30, 1990

[30] Foreign Application Priority Data

Jul. 31, 1989 [JP] Japan ........ 1-196654

[51] Int. Cl.[5] ........ G01D 15/10

[52] U.S. Cl. ........ 346/76 PH

[58] Field of Search ........ 346/76 PH

[56] References Cited

U.S. PATENT DOCUMENTS 4,567,488 1/1986 Moriguchi et al. ........ 346/76 PH
4,639,741 1/1987 Inoue ........ 346/76 PH
4,737,860 4/1988 Ono et al. ........ 346/76 PH
4,809,019 2/1989 Maganuma ........ 346/76 PH
4,870,428 9/1989 Kuwabara et al. ........ 346/76 PH
4,875,056 10/1989 Ono ........ 346/76 PH
4,912,485 3/1990 Minowa ........ 346/76 PH
4,955,736 9/1990 Iwata et al. ........ 346/76 PH

*Primary Examiner*—Benjamin R. Fuller
*Assistant Examiner*—Nancy Le
*Attorney, Agent, or Firm*—Fitzpatrick, Cella, Harper & Scinto

[57] ABSTRACT

A recording apparatus for performing line-recording using a recording head in which heat generating elements are linearly arranged, and for determining an energy amount to be applied to each heat generating element according to a heat hysteresis of the corresponding heat generating element, includes a memory for storing image data for a plurality of lines, and a control circuit for sequentially designating image data to be recorded, and calculating an energy amount to be applied to the heat generating element at a record position of designated image data according to image data of a line next to the designated data.

20 Claims, 5 Drawing Sheets

RECORDING APPARATUS HAVING HEAT-GENERATING ELEMENTS DRIVEN IN VIEW OF PAST RECORDING

BACKGROUND OF THE INVENTION

1. Field of the Invention

The present invention relates to a thermal recording apparatus and, more particularly, to a recording apparatus for controlling to vary an energy to be applied to heat generating elements in consideration of an ambient temperature of the heat generating elements.

2. Related Background Art

Conventionally, a recording apparatus for performing line-recording of a dot array for one line using a recording head in which heat generating elements are linearly arranged is known. A heat generating temperature of the heat generating elements are influenced by an ambient temperature, and varies depending on whether the adjacent heat generating element generates heat or not. Therefore, in a conventional recording apparatus of this type, an energy applied to the heat generating elements, more specifically, an applying time of a voltage, is varied so that the temperature of the heat generating elements for performing recording is kept constant. A sequence for setting an applying time of a voltage will be described below with reference to FIG. 6.

FIG. 6 shows the positional relationship between a dot position of an object to be recorded, and dot data used for setting a voltage applying time.

An applying time of a dot 50 to be recorded is determined using dot data at positions a to g in FIG. 6. That is, if dot data (black data indicating the presence of dot recording is represented by "1", and blank data indicating the absence of dot recording is represented by "0") are represented by A to G in correspondence with positions a to g, a pulse applying time is determined by:

$$\{(A + C + F + G) + 2B + 3D\} \times \frac{\text{pulse width per dot}}{10}$$

A maximum pulse width of one dot corresponds to a numeric value obtained by multiplying a maximum electricity supply time assigned to each divided block of the heat generating elements by coefficients 0 to 1 according to thermistor temperature data.

For example, in order to allow line-recording of an A4-sized recording member, the number of heat generating elements for one line is set to be 1728, the heat generating element group is divided into four blocks, and a recording time for one line is set to be 2.5 ms. A maximum allowable electricity supply time for applying a voltage of 24 V to all the 432 elements in one block is given by 2.5 ms÷4=0.625 ms. The temperature of the heat generating elements is kept constant, thus allowing high-quality dot recording.

However, as the recording speed and recording pixel density become higher, dot image quality tends to be degraded. This problem remains unsolved.

As applications associated with heat hysteresis control, U.S. Pat. Nos. 4,737,860 and 4,875,056 are known. However, no applications which can solve the above problem have not yet been proposed.

SUMMARY OF THE INVENTION

It is an object of the present invention to improve a recording apparatus in consideration of the above-mentioned problem.

It is another object of the present invention to provide a recording apparatus which can perform high-quality dot-recording even at a high recording speed and a high recording pixel density.

It is still another object of the present invention to provide a recording apparatus which calculates an energy amount applied to a heat generating element at a position of a dot to be recorded on the basis of dot data in a surrounding predetermined area having the position of the dot to be recorded as the center, thereby performing recording.

It is still another object of the present invention to provide a recording apparatus which controls an energy to be applied to a heat generating element at a position of a dot to be recorded on the basis of dot data of a line at the back of the position of the dot to be recorded (non-recorded line) when recording is performed by linear heat generating elements.

The above and other objects of the present invention will be apparent from the following detailed description of the embodiment and the accompanying drawings.

DETAILED DESCRIPTION OF THE PREFERRED EMBODIMENT

An embodiment of the present invention will be described hereinafter with reference to the accompanying drawings.

Figure 1:
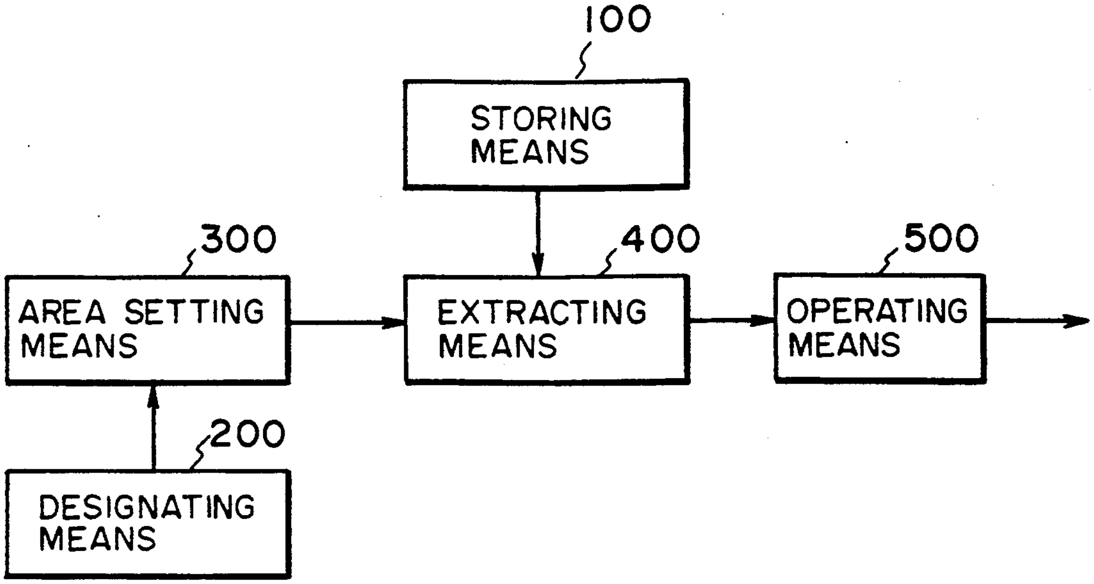
FIG. 1 is a block diagram showing a basic arrangement of an embodiment of the present invention.

FIG. 1 shows the basic arrangement of the embodiment of the present invention.

In FIG. 1, a storing means 100 serves as a recording apparatus for performing line-recording in which heat generating elements are linearly arranged, and for defining an energy amount to be applied to each heat generating element by heat hysteresis of the heat generating elements, and stores image data to be recorded received from an external apparatus for several lines in correspondence with record positions.

A designating means 200 sequentially designates image data in a line direction.

An area setting means 300 sets an area of a predetermined shape including at least a portion of the next line having a record position of image data designated by the designating means as the center.

An extracting means 400 extracts image data at pixel positions included in the area set by the area setting means from the storing means.

An operating means 500 executes a predetermined arithmetic operation using the image data extracted by the extracting means, thereby calculating an energy amount to be applied to a heat generating element at a record position of image data designated by the designating means.

Figure 2:
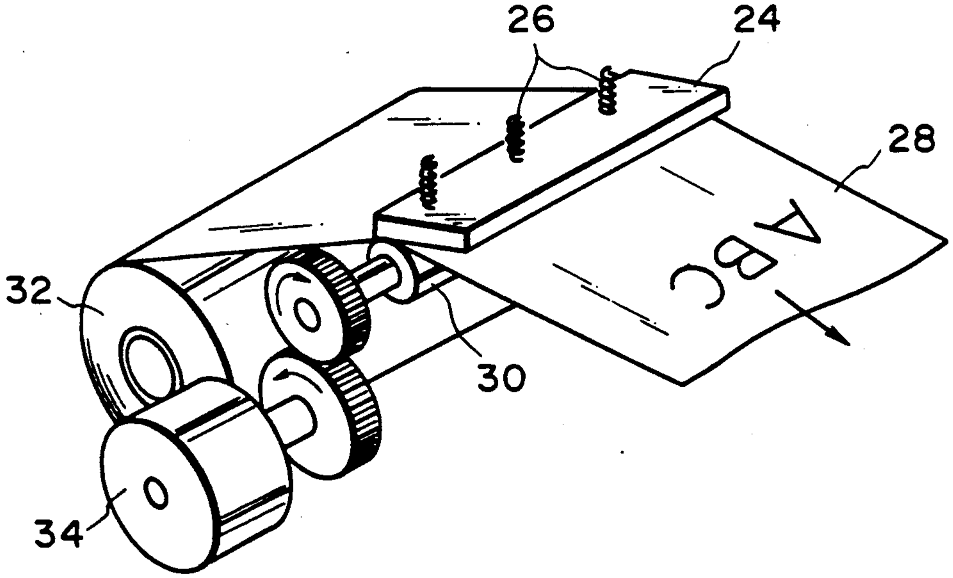
FIG. 2 is a perspective view showing a structure of a printing mechanism according to the embodiment of the present invention.

FIG. 2 shows a schematic structure of a printing mechanism of a facsimile apparatus according to the embodiment of the present invention.

Since the printing mechanism can employ a known mechanism, a description thereof will be briefly made. In FIG. 2, a thermal head 24 is arranged to sandwich record paper between itself and a platen roller 30. Heat generating elements for one line are arranged in the thermal head in a main scan direction. These heat generating elements are divided into four blocks, and are time-serially driven in units of blocks.

Upon rotation of a record paper motor 34, the platen roller 30 is rotated to convey record paper 28 to a thermal head position in a sub-scan direction. The record paper on which an image is recorded by the thermal head 24 is conveyed to an exhaust roller (not shown). The record paper is cut into a page by a cutter (not shown) upon completion of recording for one page, and the cut sheet is exhausted (or ejected) by the exhaust roller.

Figure 3:
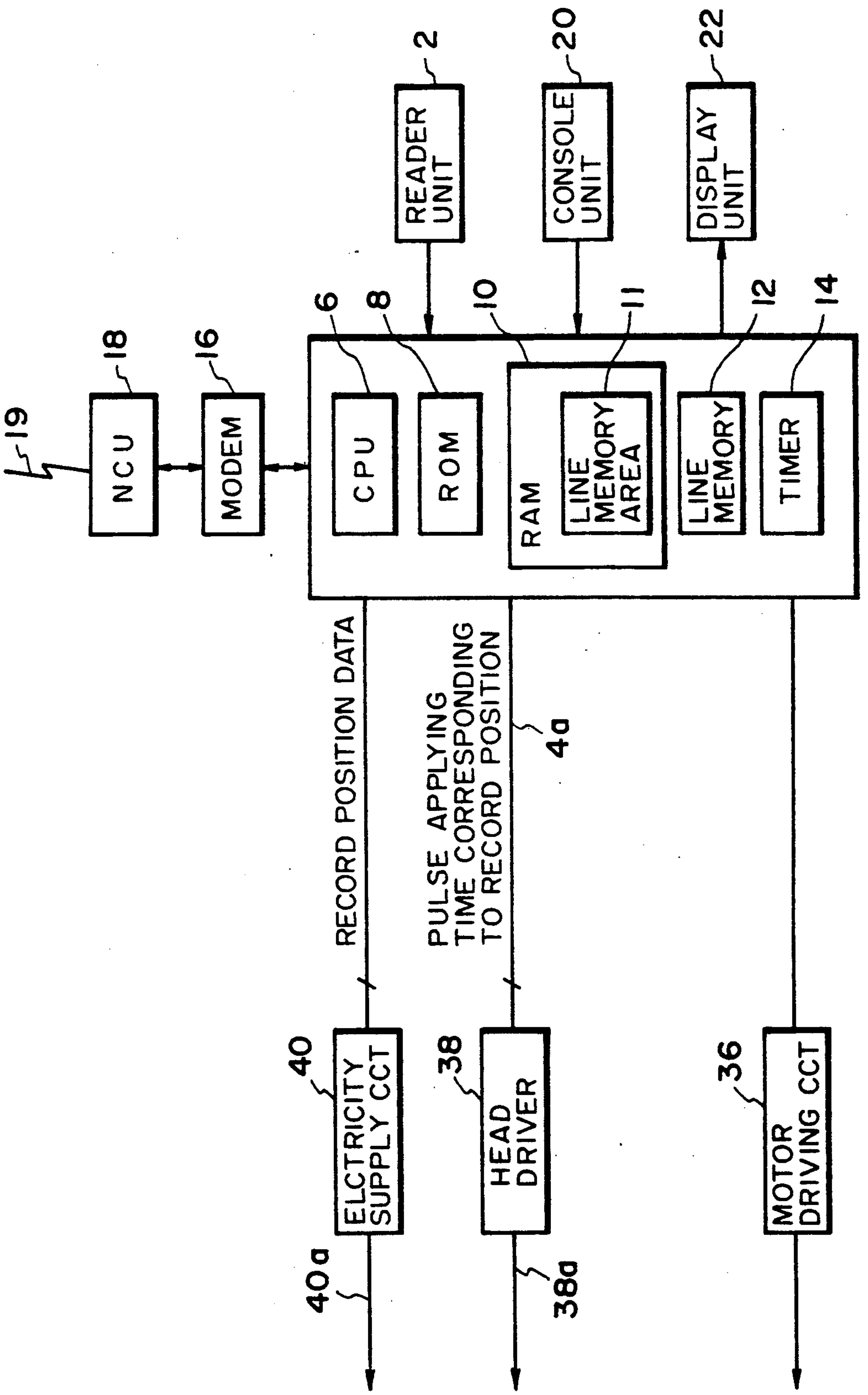
FIG. 3 is a block diagram showing a detailed circuit arrangement according to the embodiment of the present invention.

FIG. 3 shows a circuit arrangement of a main part of a control system according to the embodiment of the present invention.

A control unit 4 is connected to a modem 16, a reader unit 2, a console unit 20, a display unit 22, a motor driving circuit 36, a head driver 38, and an electricity supply circuit 40.

The control unit 4 has a central processing unit (CPU) 6, a read-only memory (ROM) 8, a random access memory (RAM) 10, a line memory 12, and a timer 14. The CPU 6 executes a control sequence (FIG. 4) stored in the ROM 8, and controls operations of the overall apparatus, e.g., calculates a voltage applying time of the heat generating elements.

The RAM 10 has a line memory area for storing recording information for a plurality of lines (five lines in this embodiment) received so far.

The line memory 12 temporarily stores recording data for a recording line.

The timer 14 detects that a reception data interval exceeds a predetermined period of time.

The console unit 20 issues operation instructions for the CPU 6, e.g., a data transmission instruction, and inputs a destination telephone number to the CPU 6. The console unit 20 has a display unit for displaying the instruction data, input data, and transmission data from the CPU 6.

The reader unit 2 reads an original image to be transmitted, and outputs the read data to the control unit 4 in the form of a digital image signal. The image data read by the reader unit 2 is encoded by the control unit 4, and is transmitted to a destination station via the modem 16, a network control unit (NCU) 18, and a telephone line 19. The encoded image data received via the telephone line 19, the NCU 18, the modem 16, and the control unit 4 is converted into image data by the control unit 4, and the converted image data is printed out by the printing mechanism shown in FIG. 2.

The head driver 38 supplies an applying energy to the heat generating elements in the block to be energized which is selected by the electricity supply circuit for a designated applying time. The electricity supply circuit 40 sets the heat generating elements of the block designated by the CPU 60 in an energization enable state. A recording operation in the above-mentioned circuit will be described below with reference to the flow chart of FIG. 4 and the explanatory view of FIG. 5.

The characteristic feature of the recording operation of this embodiment is that dot recording data of a plurality of lines next to a line to be recorded are referred to set a pulse applying time.

Figure 4:
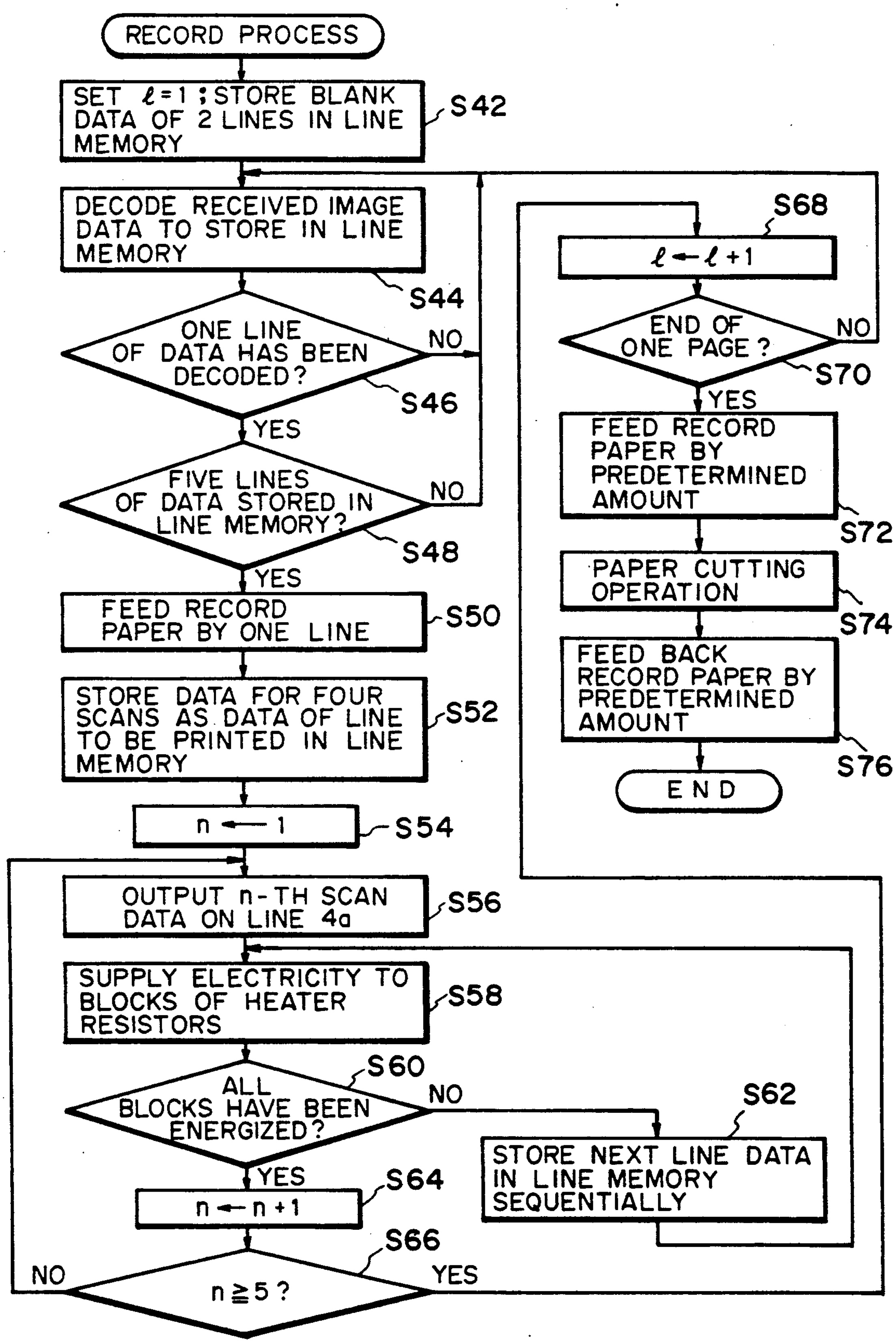
FIG. 4 is a flow chart showing a control sequence executed by a CPU 6 shown in FIG. 3.

When the facsimile apparatus is set in a reception mode, the control sequence shown in FIG. 4 is executed by the CPU 6. More specifically, as shown in FIG. 4, an initial value of $l=1$ is set as a line to be recorded in initialization processing. As dot storing data for $(l-2)$th and $(l-1)$th lines, blank (or white) data (bit="0") are written in a corresponding storage area in the line memory area 11 (see storage content of the line memory area 11 in FIG. 5) (step S42 in FIG. 4).

Image data for the first line received from a transmitting station is decoded, and the decoded data is written in a storage area for an(th line in the line memory area 11 (FIG. 5) (step S44 in FIG. 4).

Thereafter, received data for the second, i.e., $(l+1)$th line and the third, i.e., $(l+2)$th line are sequentially written in the $(l+1)$th and $(l+2)$th storage areas of the line memory area 11 (FIG. 5) (step S46→S48→S44) in FIG. 4).

If it is confirmed that image data for five lines are stored in the line memory area 11, a control signal for instructing a one-line feed operation of record paper is output from the CPU 6 to the motor driving circuit 36 (step S50 in FIG. 4).

The CPU 6 then calculates a pulse applying time of a dot in each column of the first line. In this embodiment, the pulse applying time is determined as follows.

Figure 5:
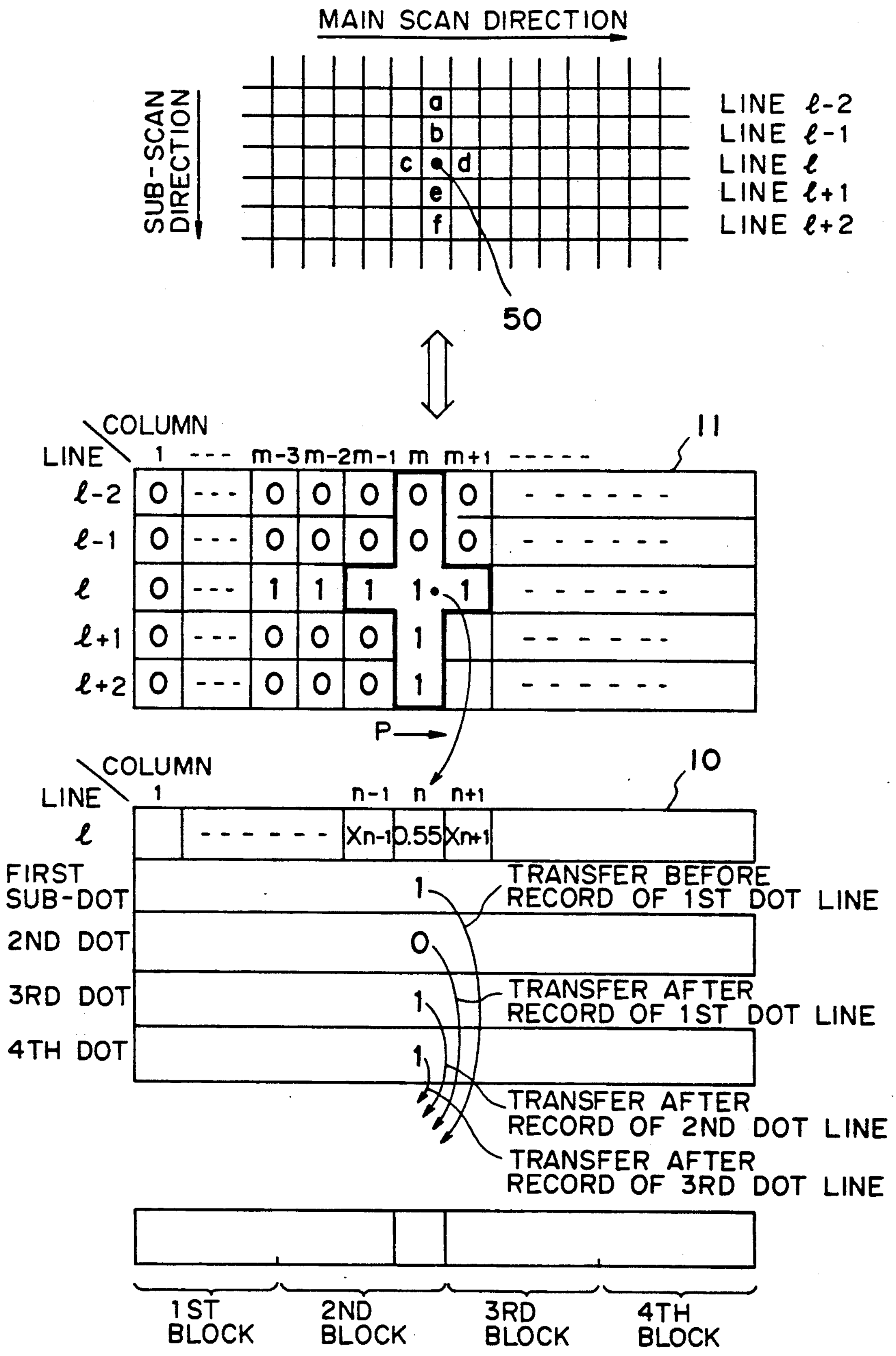
FIG. 5 is a view for explaining the correspondence between positions of dot data used to calculate a pulse applying time, and storage addresses of a line memory area 11 in the embodiment of the present invention.
Figure 6:
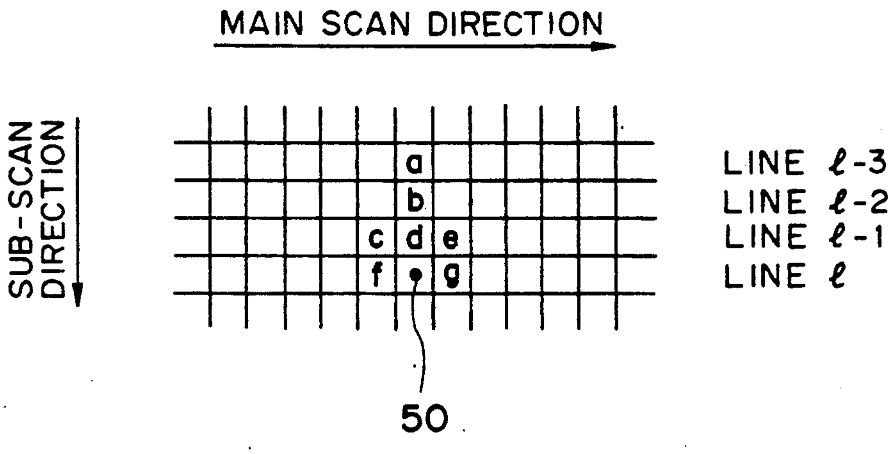
FIG. 6 PRIOR ART
FIG. 6 is a view for explaining positions of dot data used to calculate a pulse applying time in the prior art.

In FIG. 5, if a pulse applying time of a dot at an nth column position indicated by a mark • is represented by $X_n$ and dot data at surrounding positions a to f are represented by A to F, $X_n$ is given by:

$$X_n=\{0.5(C+D)+1.5(A+F)+3(B+E)\}/10$$

Since one dot is formed by four recording scans,

- when $X_n \geqq 0.8$, sub-dots in the four scans are set to be all black data;
- when $0.8 > X_n \geqq 0.6$, sub-dots in the first to third scans are set to be black data;
- when $0.6 > X_n \geqq 0.4$, sub-dots in the first and third scans are set to be black data;
- when $0.4 > X_n \geqq 0.2$, sub-dots in the second scan is set to be black data; and
- when $0.2 > X_n$, sub-dots in the four scans are set to be blank (or white) data.

Under these conditions, an applying time of a dot position of an object to be recorded in the nth column in FIG. 5 is calculated as $\{0.5(1+1)+(1.5(0+1)+3(0+1)\}/10=0.55$. Thus, the CPU 6 writes bit data indicating that sub-dots in the first and third scans are black data, and applying time data in the work area of the RAM 10. In this manner, the applying time data of image data for one line is stored in the RAM 10 (step S52 in FIG. 4).

The CPU then sets n indicating a recording block to be 1 (step S54 in FIG. 4) to start the first recording scan, and allows the electricity supply circuit 40 to supply electricity to the heat generating elements of the first block (step S56 in FIG. 4). Dot data for the first block stored in the line memory 12 (FIG. 5) are transmitted to the head driver 38, thus starting recording by the heat generating element of the first block (step S58 in FIG. 4).

After the heat generating elements are driven, dot data for the next recording scan in which the heat generating elements correspond to a record position are read out from the RAM 10, and are stored in the corresponding storage areas of the line memory 12 (step S58→S60→S62→S58 in FIG. 4). The heat generating elements up to the fourth blocks are driven in the same manner as described above, thus completing one-line recording. When second (n=2), third, and fourth recording scans in the first line are executed, it is detected that recording for the first line is completed (step S66), and a line position (l) to be recorded is updated (step S68 in FIG. 4). If recording for one page is not completed, the flow returns from step S70 to step S44, applying times of the heat generating elements of the present line to be recorded are calculated. The above-mentioned sequence is repeated, that is, four recording scans per line and time-serial recording for four blocks are repetitively executed. After image data of one page are recorded (step S70), record paper feed processing, recorded paper cut processing, and processing for returning recording paper to a record position are executed. Thereafter, the control waits reception of image data of the next page (step S72→S76 in FIG. 4).

When image data are transmitted from an external apparatus during execution of the above-mentioned control sequence, this control sequence is interrupted, and the received image data are stored in the RAM 10 in correspondence with record positions. Every time image data are received, the timer 14 is reset. When the timer 14 counts up, image data at an immediately preceding line position b used for calculating an applying time for the next dot (FIG. 5) is processed as blank data. For this reason, upon reception of a count-up signal of the timer 14, the CPU 6 sets a flag in an internal register. When this flag is set, image data for the immediately preceding line are set to be blank data.

Therefore, even if the heat generating elements are cooled when reception of image data is delayed, calculation of a pulse applying time will not be adversely influenced.

When image data are replaced with blank data like first, second,..., preceding lines according to delay times of reception of image data, calculation results of applying times and actual recording densities can satisfactorily coincide with each other. The following modifications may be made in addition to the embodiment of the present invention.

1) In this embodiment, no correction based on a temperature detected by a temperature sensor of a thermal head is performed. An applying time calculated by the CPU 6 may be corrected by the temperature sensor. Since correction processing of an applying time on the basis of the temperature sensor is known to those who are skilled in the art, a detailed description of a control sequence will be omitted. In this case, an applying time for each dot is preferably corrected so as not to exceed a time assigned to record data of one line.

2) In this embodiment, a heat-sensitive recording apparatus for recording an image on heat-sensitive paper has been described. However, the present invention is applicable to a thermal transfer recording apparatus for performing thermal transfer through an ink sheet, and a multi-print thermal transfer recording apparatus for effectively utilizing an ink sheet by decreasing a feed speed of the ink sheet to be lower than a feed speed of record paper.

As described above, according to the present invention, since energy amounts to be applied to heat generating elements are determined with reference to dot data of the next and subsequent lines, the temperature of the heat generating elements can be kept stable, and high-speed, high-density recording can be realized. In addition, recording image quality such as a thin line can be improved.

The present invention is not limited to the above embodiment, and various changes and modifications may be made within the spirit and scope of the invention.

What is claimed is:

1. A recording apparatus for performing line-recording using a recording head in which heat generating elements are linearly arranged, and for determining an energy amount to be applied to each heat generating element according to a heat hysteresis of a corresponding heat generating element in the recording head, comprising:

storing means for storing image data for a plurality of lines; and operating means for sequentially designating image data to be recorded, and calculating an energy amount to be applied to the heat generating element at a record position of designated image data according to image data in an area adjacent to the record position of the designated image data;

wherein when a reception interval of image data to be recorded exceeds a predetermined period of time, said operating means calculates the applying energy amount considering said image data in an area adjacent to the record position of the designated image data as specified image data.

2. An apparatus according to claim 1, wherein said operating means calculates the energy amount according to image data in a predetermined area which has a record position of the designated data as a center.

3. An apparatus according to claim 2, wherein said predetermined area includes image data in a line subsequent to the designated data.

4. A recording apparatus according to claim 1, wherein said specified image data is blank data.

5. A recording apparatus for performing line-recording using a recording head in which heat generating elements are linearly arranged, and for determining an energy amount to be applied to each heat generating element according to a heat system is of a corresponding heat generating element in the recording head, comprising:

storing means for storing image data of a plurality of lines to be recorded received from an external apparatus in correspondence with record positions;

designating means for sequentially designating the image data along a line direction;

setting means for setting an area of a predetermined shape which has a record position of image data designated by said designating means as a center;

extracting means for extracting image data at respective pixel positions included in the area designated by said setting means, from said storing means; and operating means for executing a predetermined arithmetic operation using the image data extracted by said extracting means, and calculating an energy amount to be applied to the heat generating element at the record position of the image data designated by said designating means;

wherein when a reception interval of the image data to be recorded exceeds a predetermined period of time, said operating means processes image data in the area to be used by said operating means as specified data.

6. An apparatus according to claim 4, wherein said image data in the area includes image data in a line subsequent to the image data designated by said designating means.

7. A recording apparatus according to claim 5, wherein said specified image data is blank data.

8. A recording apparatus for performing line-recording using a recording head in which heat generating elements are linearly arranged, and for determining an energy amount to be applied to each heat generating element according to a heat hysteresis of a corresponding heat generating element in the recording head, comprising:

a memory for storing received image data for a plurality of lines; and a control circuit for sequentially designating image data to be recorded, calculating an energy amount to be applied to the heat generating element at a record position of designated image data according to image data in an area adjacent to the record position of the designated image data, and controlling said recording heat in accordance with the calculated energy amount;

wherein when a reception interval of image data to be recorded exceeds a predetermined period of time, said control circuit calculates the applying energy amount such that said image data in an area adjacent to the record position of the designated image data is processed as specified data.

9. An apparatus according to claim 8, wherein said control means calculates the energy amount according to image data in a predetermined area having a record position of the designated image data as a center.

10. An apparatus according to claim 9, wherein said image data in the predetermined area includes image data in a line subsequent to the designated image data.

11. A recording apparatus according to claim 8, wherein said specified image data is blank data.

12. A recording apparatus for recording an image using a recording head having a plurality of heat generating elements, comprising:

memory means for storing image data of a plurality of lines including a present line to be recorded and a preceding line;

control means for calculating an energy amount to be applied to the heat generating elements of the recording head regarding a dot under consideration, on a basis of both image data corresponding to a dot under consideration in the present line, stored in said memory means, and image data corresponding to a dot adjacent to a dot under consideration in the preceding line;

drive means for driving the heat generating elements of the recording head on a basis of the energy amount calculated by said control means; and measuring means for measuring a reception interval of the image data, wherein when the reception interval measured by said measuring means exceeds a predetermined value, said control means calculates the energy amount to be applied to the heat generating elements of the recording head regarding the dot under consideration in the present line, considering image data corresponding to dots adjacent to the dot under consideration as specified image data.

13. An apparatus according to claim 12, wherein said memory means further stores image data in a line subsequent to the present line.

14. An apparatus according to claim 13, wherein said control means further calculates the energy amount to be applied to the heat generating elements of the recording head regarding the dot under consideration, taking into consideration image data corresponding to a dot adjacent to the dot under consideration in a line subsequent to the present line.

15. An apparatus according to claim 12, further comprising setting means for initially setting blank data as image data of the preceding line, in said storing means, wherein said control means calculates the energy amount to be applied to the heat generating elements of the recording head regarding the dot under consideration in the first line, in accordance with image data corresponding to the dot under consideration and the blank data.

16. An apparatus according to claim 12, wherein said specified data is blank data.

17. An apparatus according to claims 12, 13, 14, 15 or 16, wherein said recording head further comprises a plurality of heat generating element corresponding to a recording width of one line.

18. An apparatus according to claim 12, further comprising receiving means for receiving image data sent from a destination station, wherein said memory means stores image data of plural lines received by said receiving means.

19. An apparatus according to claim 18, further comprising reading means for reading image data, and sending means for sending to the destination station the image data read by said reading means.

20. An apparatus according to claims 12, 13, 14, 15, 16, 18, or 19, wherein the recording head is actuated to record an image on a thermosensible paper.

* * * * *

UNITED STATES PATENT AND TRADEMARK OFFICE
CERTIFICATE OF CORRECTION

PATENT NO. : 5,103,245

DATED : April 7, 1992

INVENTOR(S) : TAKEHIRO YOSHIDA

It is certified that error appears in the above-identified patent and that said Letters Patent is hereby corrected as shown below: On title page,

AT [56] REFERENCES CITED

U.S. Patent Documents,
"Maganuma" should read --Haganuma--.

AT [57] ABSTRACT

Line 2, "heat generating" should read --heat-generating--.
Line 4, "heat generating" should read --heat-generating--.
Line 6, "heat generating" should read --heat-generating--.
Line 10, "heat generating" should read --heat-generating--.

SHEET 2 OF 5

FIG. 3, Insert below "TIMER -14," -- -4 CONTROL UNIT--.

COLUMN 1

Line 67, "no" should be deleted.

COLUMN 4

Line 12, "referred" should read --referred to--.
Line 25, "an(th line" should read --an ℓth line--.
Line 30, "S44) in" should read --S44 in--.
Line 61, "(1.5(0+1)" should read --1.5(0+1)--.

COLUMN 5

Line 30, "waits" should read --awaits--.

UNITED STATES PATENT AND TRADEMARK OFFICE

CERTIFICATE OF CORRECTION

PATENT NO. : 5,103,245

DATED : April 7, 1992

INVENTOR(S) : TAKEHIRO YOSHIDA

It is certified that error appears in the above-identified patent and that said Letters Patent is hereby corrected as shown below:

COLUMN 6

Line 55, "heat system is" should read --heat hysteresis--.

COLUMN 7

Line 12, "claim 4," should read --claim 5,--.
Line 33, "recording heat" should read --recording head--.

COLUMN 8

Line 56, "thermosensible" should read --thermosensitive--.

Signed and Sealed this

Third Day of August, 1993

Attest:

Michael K. Kirk

MICHAEL K. KIRK

Attesting Officer

*Acting Commissioner of Patents and Trademarks*